US010953412B2

(12) United States Patent
Bauer et al.

(10) Patent No.: US 10,953,412 B2
(45) Date of Patent: Mar. 23, 2021

(54) HYDRODYNAMIC SEPARATOR

(71) Applicant: CONTECH ENGINEERED SOLUTIONS LLC, West Chester, OH (US)

(72) Inventors: Mathew E. Bauer, Portland, OR (US); Michael B. Brooks, Battle Ground, WA (US); Lindsey B. Mathys, Portland, OR (US); Dwane A. Paulsen, Portland, OR (US); Hannah E. Schlachter, Middletown, OH (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 0 days.

(21) Appl. No.: 16/516,913

(22) Filed: Jul. 19, 2019

(65) Prior Publication Data

US 2020/0023382 A1 Jan. 23, 2020

Related U.S. Application Data

(60) Provisional application No. 62/701,909, filed on Jul. 23, 2018.

(51) Int. Cl.
*E03F 5/14* (2006.01)
*B04C 5/103* (2006.01)
(Continued)

(52) U.S. Cl.
CPC ............ *B04C 5/103* (2013.01); *B01D 21/265* (2013.01); *B04C 5/06* (2013.01); *B04C 5/081* (2013.01);
(Continued)

(58) Field of Classification Search
CPC .. E03F 5/0403; E03F 5/14; B04C 5/04; B04C 5/06; B04C 5/103; B01D 21/265; C02F 2103/001; C02F 2301/026
(Continued)

(56) References Cited

U.S. PATENT DOCUMENTS 5,232,587 A * 8/1993 Hegemier ............. E03F 5/0401
210/170.03
6,120,684 A 9/2000 Kistner
(Continued)

OTHER PUBLICATIONS

PCT, International Search Report and Written Opinion, International Application No. PCT/US2019/042741; dated Oct. 4, 2019, 8 pages.

*Primary Examiner* — Christopher Upton
(74) *Attorney, Agent, or Firm* — Thompson Hine LLP

(57) ABSTRACT

A separator unit includes a tank defining an internal volume and having an inlet and an outlet. An insert is provided within the tank, the insert including a down cylinder substantially centrally disposed within the tank and a baffle assembly at an external side of the down cylinder. The baffle assembly defines first and second inlet flumes for flowing incoming water from an external side of the down cylinder to an internal volume within the down cylinder. Inward ends of the first and second inlet flumes are positioned and oriented to create first and second vortex flows that progress downward within the internal volume, wherein a rotational direction of the first vortex flow is opposite a rotational direction of the second vortex flow in top plan view.

28 Claims, 20 Drawing Sheets

(51) Int. Cl.
  *B04C 5/081* (2006.01)
  *B04C 5/06* (2006.01)
  *C02F 1/38* (2006.01)
  *B04C 5/12* (2006.01)
  *E03F 5/04* (2006.01)
  *B01D 21/26* (2006.01)
  *C02F 103/00* (2006.01)

(52) U.S. Cl.
  CPC ............... *B04C 5/12* (2013.01); *C02F 1/385* (2013.01); *E03F 5/0403* (2013.01); *E03F 5/14* (2013.01); *C02F 2103/001* (2013.01); *C02F 2301/026* (2013.01)

(58) Field of Classification Search
  USPC .............. 210/747.2, 787, 170.03, 512.1
  See application file for complete search history.

(56) References Cited

U.S. PATENT DOCUMENTS

| | | |
|---|---|---|
| 6,475,381 B1 | 11/2002 | Gustafsson |
| 6,547,962 B2 | 4/2003 | Kistner |
| 6,730,222 B1 | 5/2004 | Andoh |
| 6,780,310 B1 | 8/2004 | Howe |
| 6,849,182 B2 | 2/2005 | Redding |
| 6,913,155 B2 | 7/2005 | Bryant |
| 6,919,033 B2 | 7/2005 | Stark |
| 6,951,619 B2 | 10/2005 | Bryant |
| 6,991,114 B2 | 1/2006 | Allen, II |
| 7,182,874 B2 | 2/2007 | Allard |
| 7,238,281 B2 | 7/2007 | Su |
| 7,297,266 B2 | 11/2007 | Cobb |
| 7,422,683 B2 | 9/2008 | Park |
| 7,507,333 B2 | 3/2009 | Meyermann |
| 7,527,731 B2 | 5/2009 | Su |
| 7,648,638 B2 | 1/2010 | Essemiani |
| 7,666,303 B2 | 2/2010 | Williams |
| 7,699,984 B2 | 4/2010 | Andoh |
| 7,811,450 B2 | 10/2010 | Persson |
| 8,133,394 B2 | 3/2012 | Gustafsson |
| 9,222,248 B2 | 12/2015 | Anderson |
| 9,752,600 B2 | 9/2017 | Hoff |
| 9,770,722 B1 | 9/2017 | Sheker |
| 9,795,898 B2 | 10/2017 | Ernst |
| 2005/0087502 A1 | 4/2005 | Meyermann |
| 2006/0283814 A1 | 12/2006 | Williamson |
| 2007/0012608 A1 | 1/2007 | Su |
| 2007/0267342 A1 | 11/2007 | Cobb |
| 2010/0084352 A1 | 4/2010 | Pondelick et al. |
| 2011/0127204 A1* | 6/2011 | Andoh .............. E03F 5/0403 210/170.03 |
| 2019/0210894 A1* | 7/2019 | Bryant .............. B01D 21/265 |

* cited by examiner

HYDRODYNAMIC SEPARATOR

TECHNICAL FIELD

This application relates generally to separator units that receive stormwater runoff, and, more particularly, to separator units having high sedimentation, hydrocarbons, floatables and/or debris removal and retention even in the case of high flow rates.

BACKGROUND

The protection of ground water and natural bodies of water requires systems for diverting and/or treating water that contacts roadways, parking lots, and other man-made structures. A variety of stormwater separation systems exist. These systems generally include a tank or container including a storage or treatment chamber within which, ideally, floating particulates are retained, and non-floating particulates are allowed to settle. The storage chamber includes an inlet for receiving untreated water, and an outlet for movement of treated water out of the chamber. The tank may also include a bypass arrangement to allow excess untreated water to exit the tank without passing through the storage chamber.

Improvements in such separators are regularly sought.

Accordingly, it would be desirable to provide a separator with increased treatment flow capacity while at the same time incorporating one or more cost-effective features to limit scouring and washout. A separator with an easily installable insert would also be desirable.

SUMMARY

In one aspect, a separator unit includes a tank defining an internal volume and having an inlet and an outlet. An insert is provided within the tank, the insert including a down cylinder substantially centrally disposed within the tank and a baffle assembly at an external side of the down cylinder. The baffle assembly defines first and second inlet flumes for flowing incoming water from an external side of the down cylinder to an internal volume within the down cylinder. Inward ends of the first and second inlet flumes are positioned and oriented to create first and second vortex flows that progress downward within the internal volume, wherein a rotational direction of the first vortex flow is opposite a rotational direction of the second vortex flow in top plan view.

In one implementation, the first inlet flume has a rear wall, a top wall and a bottom wall, and the second inlet flume has a rear wall, a top wall and a bottom wall.

In one implementation, the down cylinder has an upper wall opening through which water traveling along the first and second inlet flumes enters the internal volume, and each bottom wall is located at a height below a lower edge of the upper wall opening.

In one implementation, a downwardly angled skirt extends outward from a bottom end of the down cylinder, the downwardly angled skirt including multiple downwardly angled openings on an inlet side of the baffle assembly, and the downwardly angled skirt being of solid wall configuration, with no openings, on a downstream side of the baffle assembly, wherein the downwardly angled skirt is spaced above a bottom of the tank to define a material collection sump below the downwardly angled skirt.

In one implementation, the downwardly angled skirt includes a first lower peripheral edge portion on the inlet side of the baffle assembly, the first lower peripheral edge portion spaced from an internal surface of a wall of the tank to define a circumferentially extending gap therebetween.

In one implementation, the downwardly extending skirt includes a second lower peripheral edge portion on the outlet side of the baffle assembly, wherein at least part of the first lower peripheral edge portion or the second lower peripheral edge portion sits upon a mount bracket engaged on the wall of the tank.

In one implementation, the down cylinder includes a lower side wall opening through which water moves to the downstream side of the baffle assembly.

In one implementation, the baffle assembly includes an upwardly extending outlet chute above the lower wall opening and through which water moves to reach the outlet of the tank.

In one implementation, the upwardly extending outlet chute is defined by rear walls of the first and second inlet flumes and by one or additional more walls that extend upward from a horizontal peripheral plate section of the baffle assembly.

In one implementation, the upwardly extending outlet chute is substantially diamond-shaped in top plan view.

In another aspect, method of removing material from a flow of stormwater involves: utilizing a separator unit with a tank defining an internal volume and having an inlet opening and an outlet opening, and a down cylinder substantially centrally disposed within the tank; flowing water into the internal volume and externally of the down cylinder through the inlet opening; and splitting the incoming flow of water into at least a first flow and a second flow, the first flow moving in a first direction externally around the down cylinder and then through an opening in the down cylinder into an internal chamber defined by the down cylinder, the second flow moving in a second direction externally around the down cylinder and then through an opening in the down cylinder into the internal chamber.

In one implementation, the first flow forms a first vortex flow within the internal volume and the second flow forms a second vortex flow within the internal volume.

In one implementation, the first vortex flow is substantially maintained on a first side of the internal volume and the second vortex flow is substantially maintained on a second side of the internal volume, and the second vortex flow opposes the first vortex flow.

In one implementation, the splitting further includes splitting the incoming flow of water into a third flow and a fourth flow, the third flow moving in the first direction externally around the down cylinder and then moving downward without entering the internal volume, the fourth flow moving in the second direction externally around the down cylinder and then moving downward without entering the internal volume.

In one implementation, the separator unit includes a baffle assembly that, in combination with the down cylinder separates the inlet opening from the outlet opening, and the method includes allowing water to flow through a lower opening in the down cylinder in order to reach a downstream side of the baffle assembly and progress to the outlet opening.

In one implementation, the baffle assembly defines an upwardly extending outlet chute through which water exiting the internal chamber passes in order to reach the outlet opening.

In a further aspect, a separator unit includes a tank defining an internal volume and having an inlet and an outlet. A down cylinder is substantially centrally disposed within the tank. A downwardly angled skirt extends outward from a bottom end of the down cylinder, the downwardly angled skirt including multiple downwardly angled openings on an inlet side of the baffle assembly, and the downwardly angled skirt being of solid wall configuration, with no openings, on a downstream side of the baffle assembly. The downwardly angled skirt is spaced above a bottom of the tank to define a material collection sump below the downwardly angled skirt.

In one implementation, the downwardly angled skirt includes a first lower peripheral edge portion on the inlet side of the baffle assembly, the first lower peripheral edge portion spaced from an internal surface of a wall of the tank to define a circumferentially extending gap therebetween.

In one implementation, the downwardly extending skirt includes a second lower peripheral edge portion on the outlet side of the baffle assembly, wherein at least part of the first lower peripheral edge portion or the second lower peripheral edge portion sits upon a mount bracket engaged on the wall of the tank.

The details of one or more embodiments are set forth in the accompanying drawings and the description below. Other features, objects, and advantages will be apparent from the description and drawings, and from the claims.

DETAILED DESCRIPTION

Figure 1:
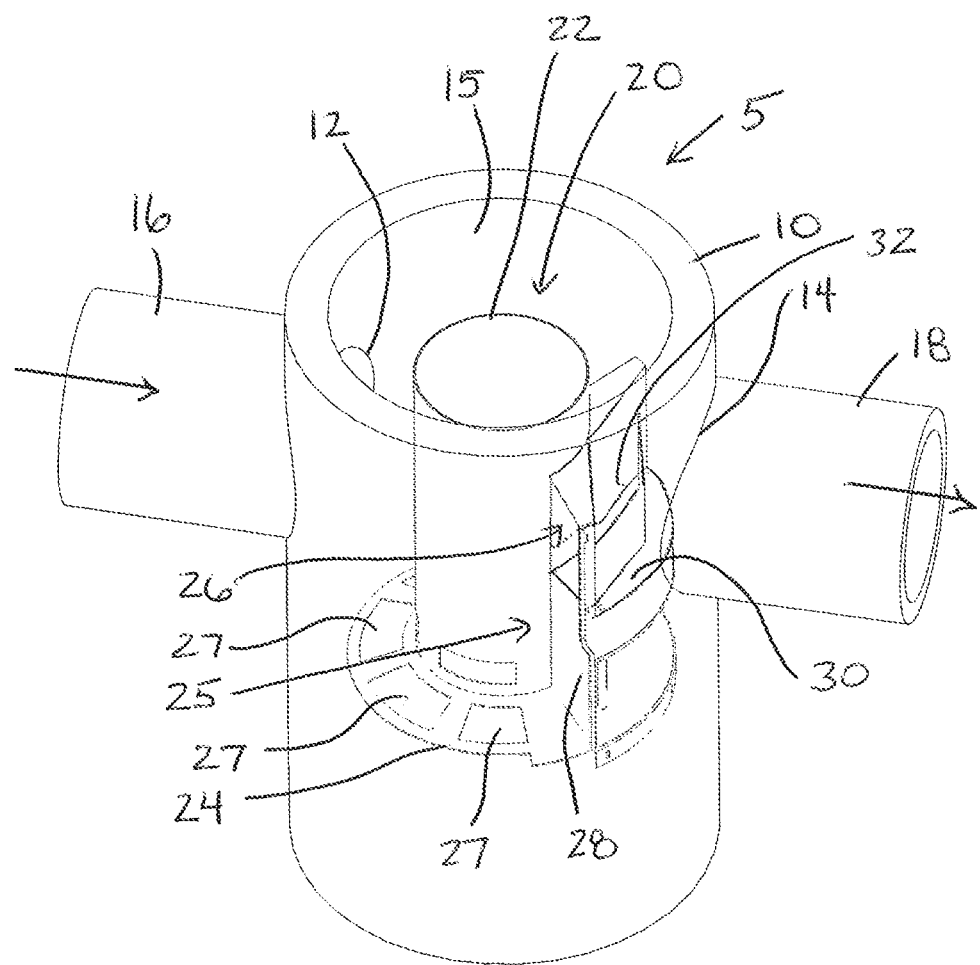
FIGS. 1-3 are perspective views of one embodiment of a separator unit, where the tank is shown as transparent.
Figure 2:
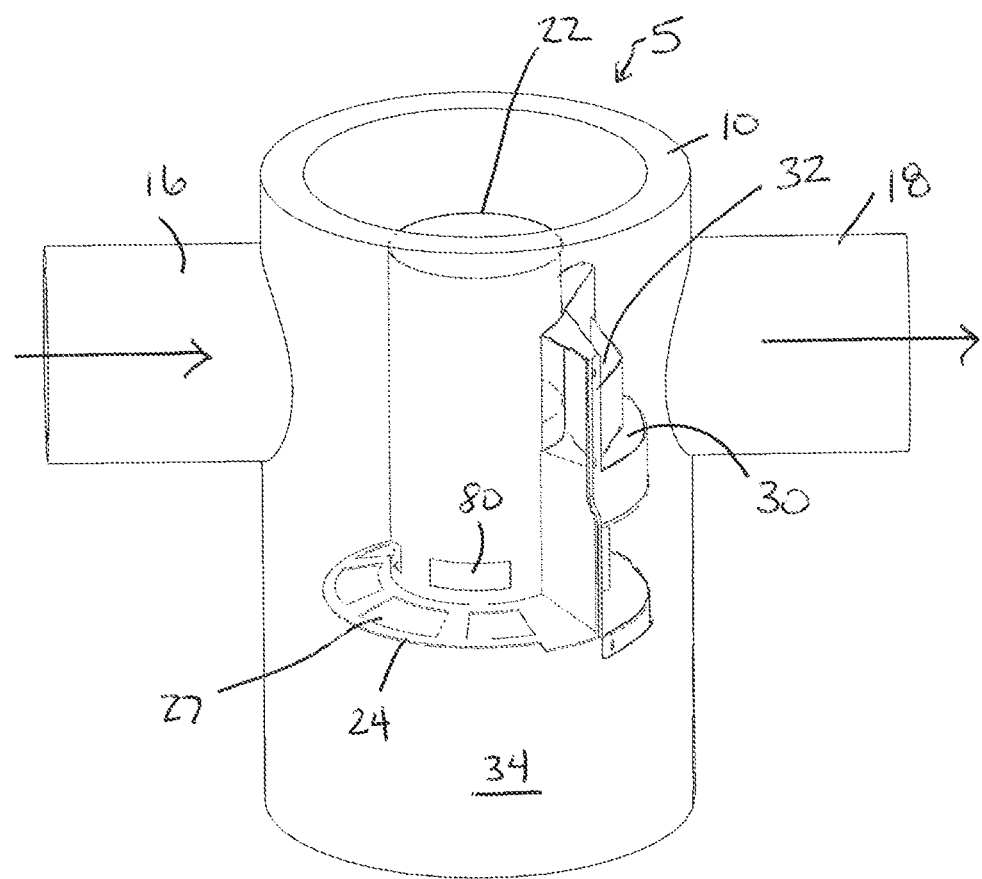
Figure 3:
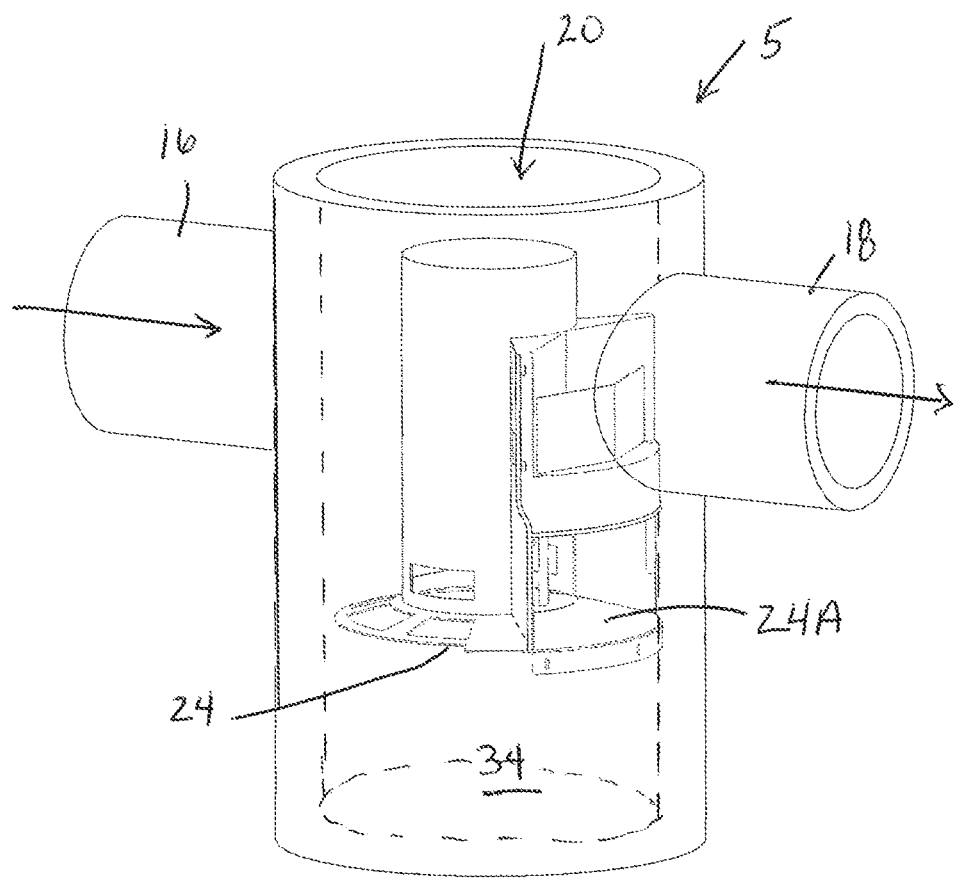
Figure 4:
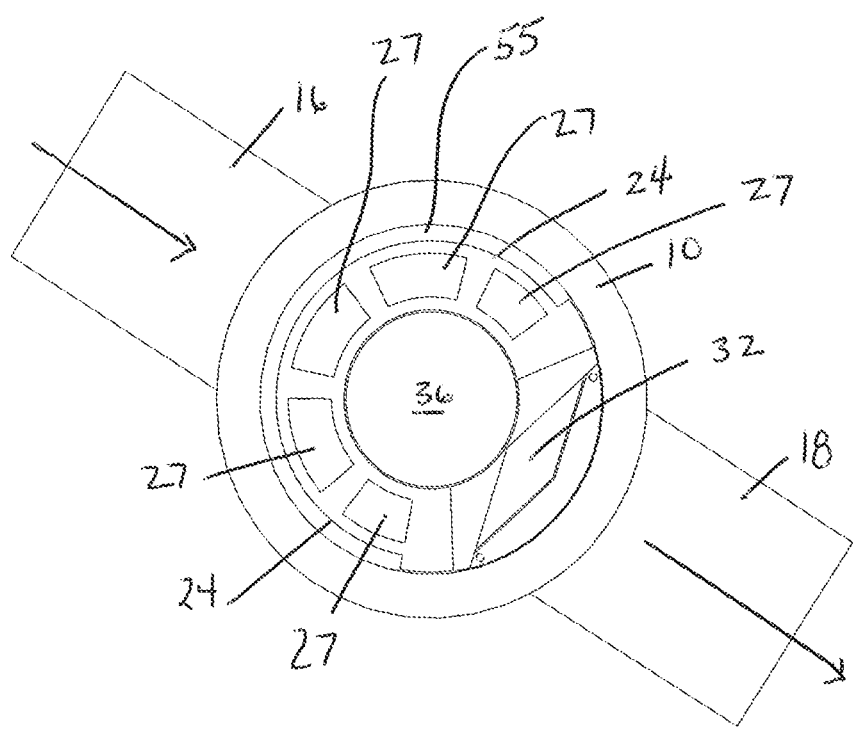
FIG. 4 is a top plan view of the separator unit.
Figure 5:
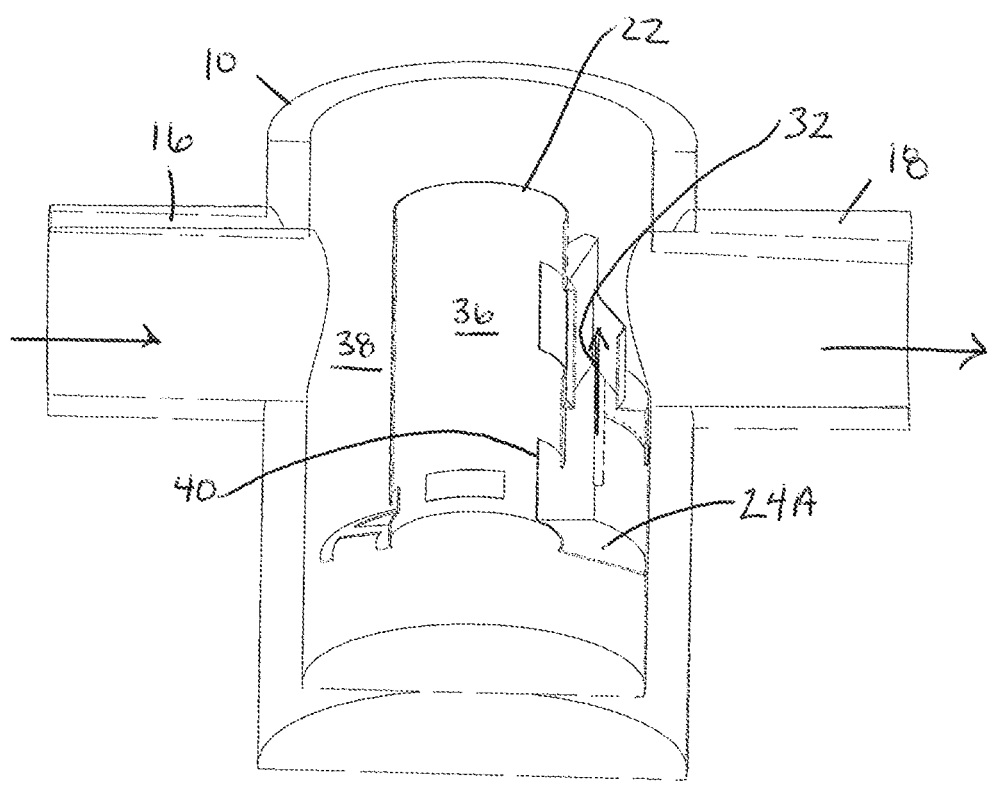
FIGS. 5 and 6 are cross-section views of the separator unit along a plane passing through the center of the separator.
Figure 6:
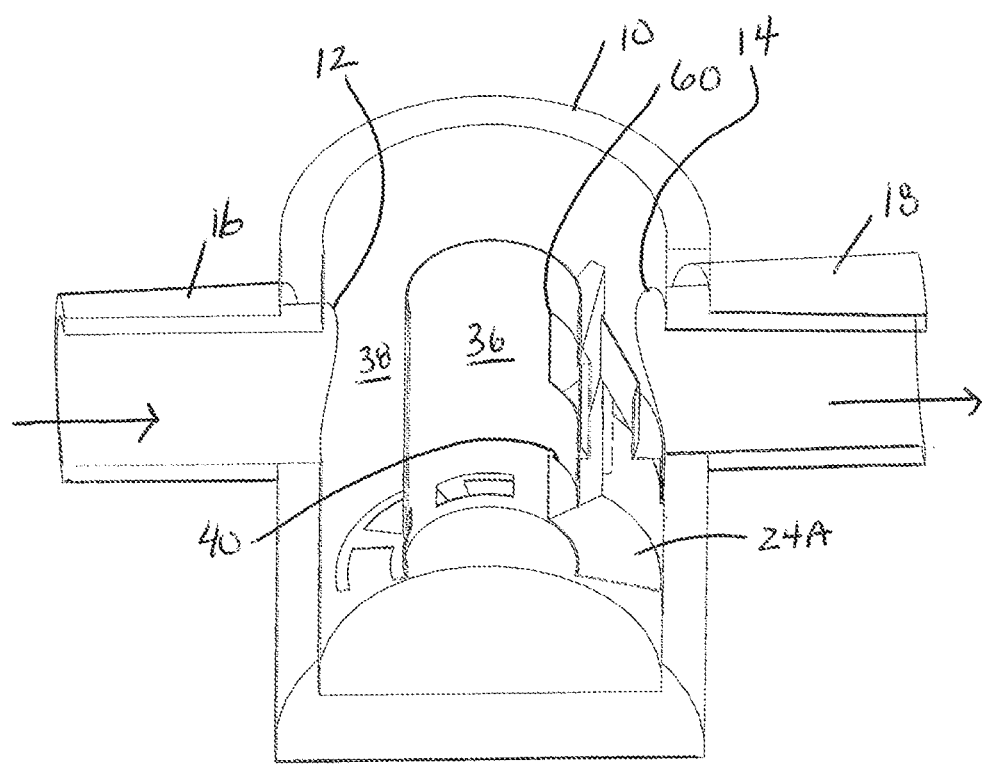
Figure 7:
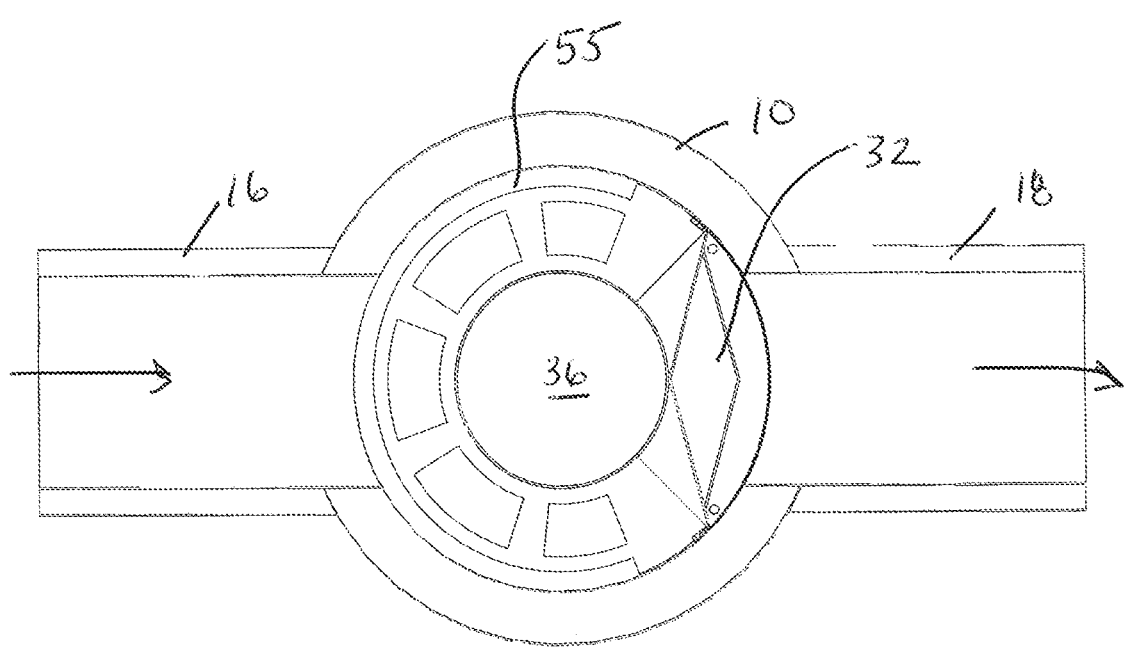
FIG. 7 is another top plan view of the separator.
Figure 8:
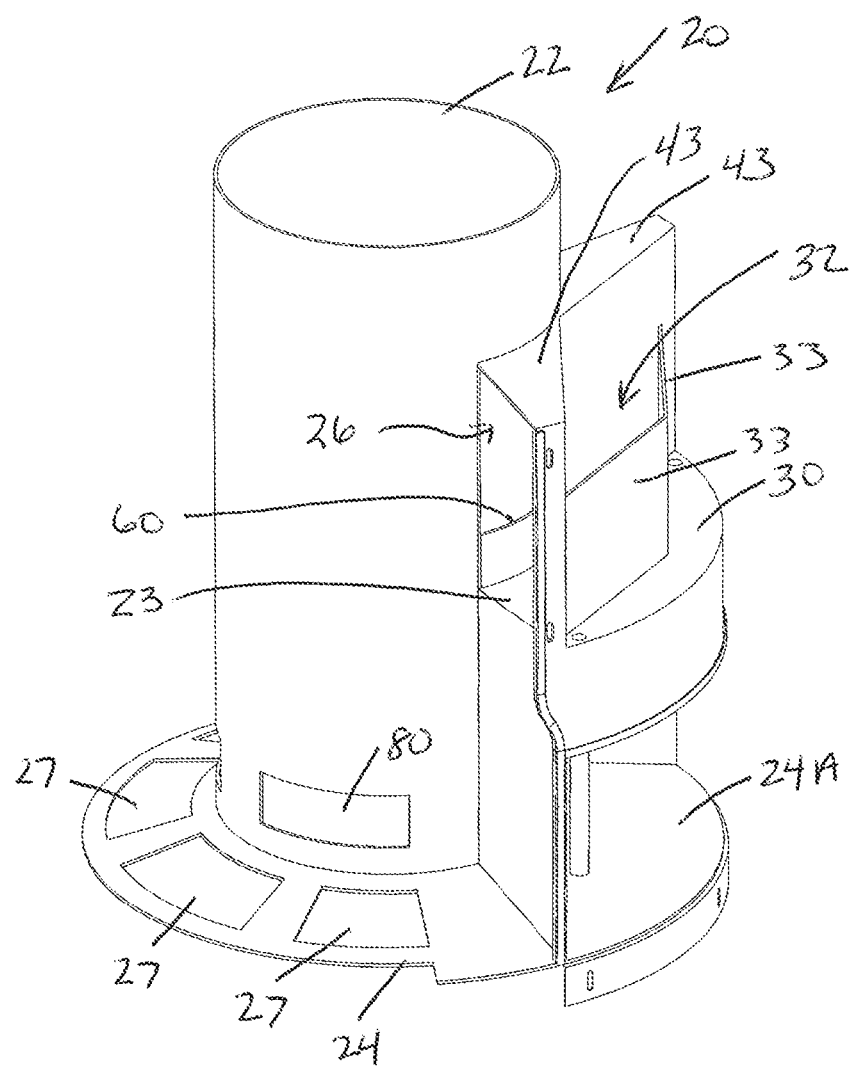
FIGS. 8-13 show perspective views of the separator unit insert.
Figure 9:
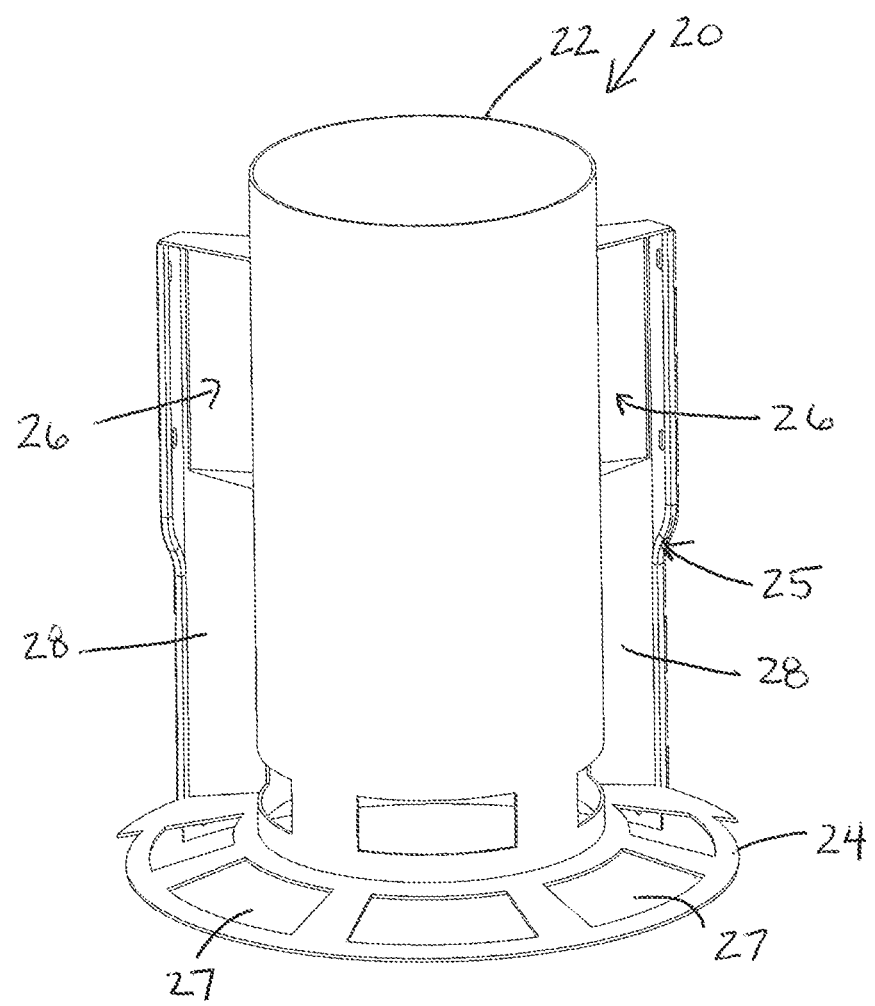
Figure 10:
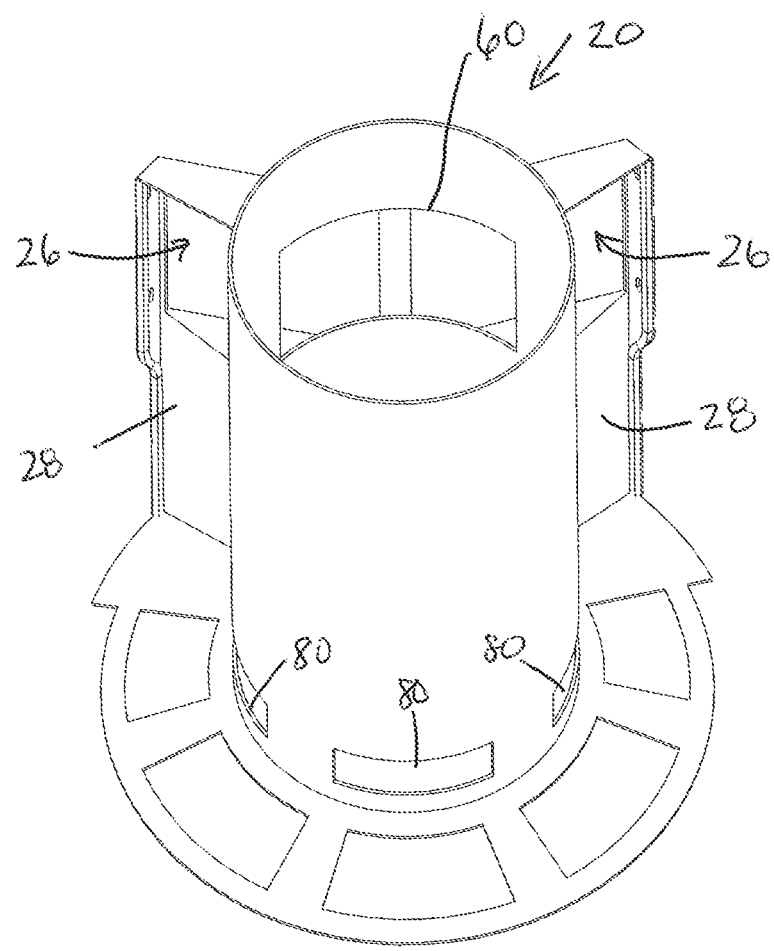
Figure 11:
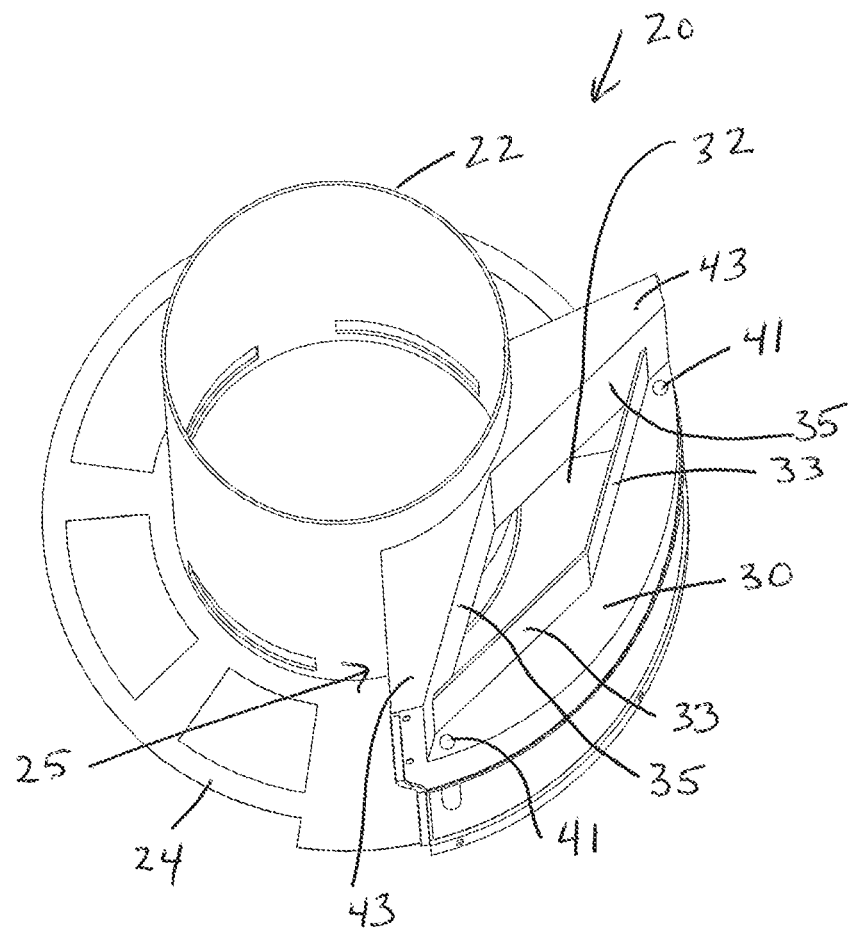
Figure 12:
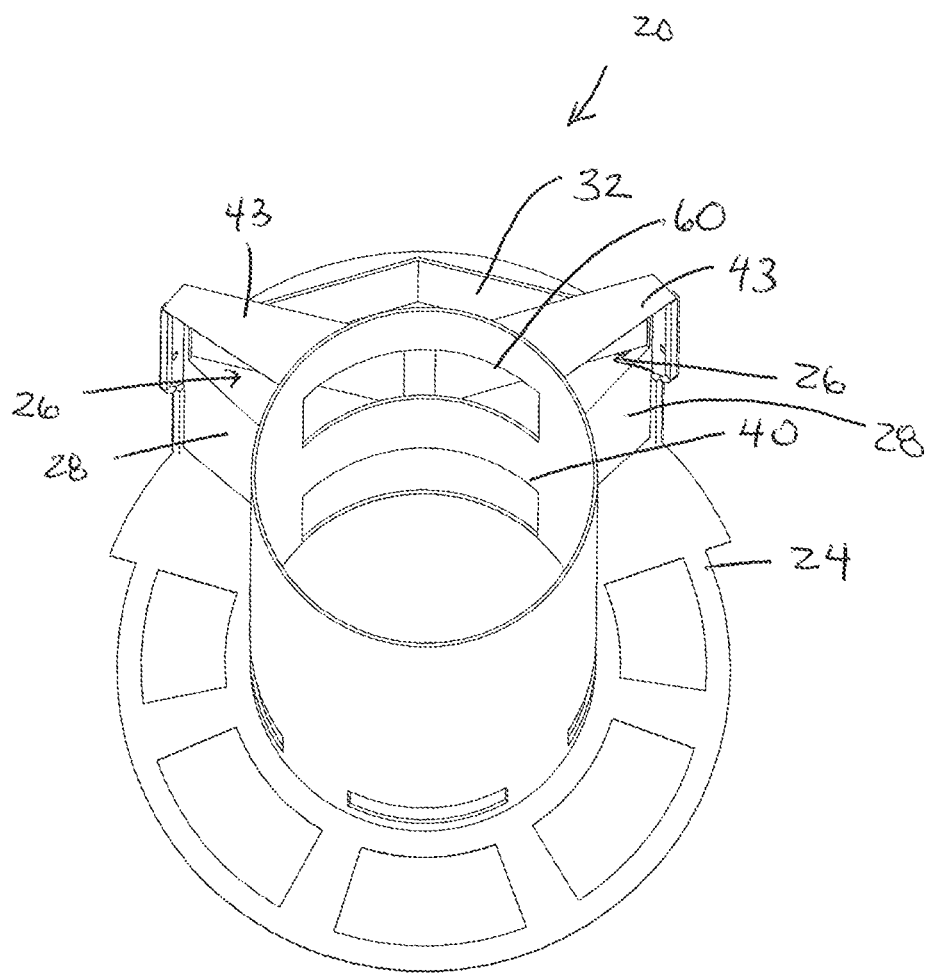
Figure 13:
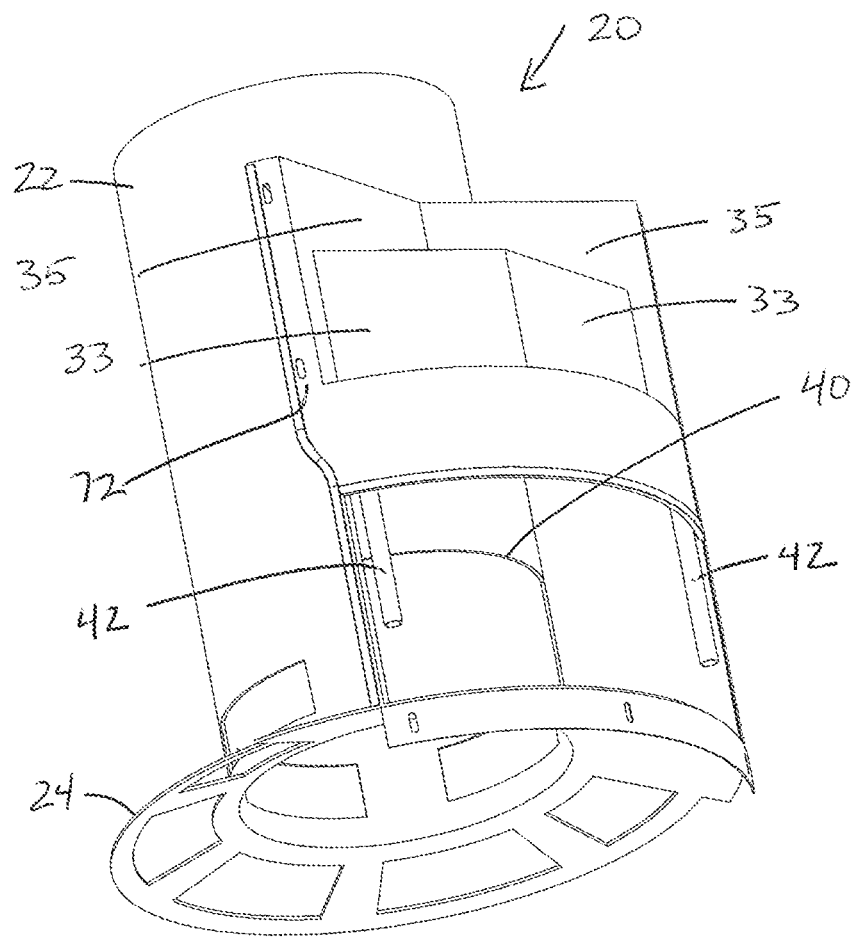

Referring to FIGS. 1-16, a hydrodynamic separator 5 includes a cylindrical tank 10 (e.g., a concrete manhole or a metal or plastic tank structure) with an inlet opening 12 and outlet opening 14 through the tank sidewall 15. An inlet pipe 16 connects to opening 12 and an outlet pipe 18 connects to opening 14. The tank includes an insert structure 20 with a down cylinder 22 located in the center of the tank. A downwardly angled skirt 24 extends outwardly from the bottom of the down cylinder 22. A baffle wall assembly (aka baffle structure or baffle arrangement) 25 is associated with the cylinder 22 at its external side and prevents water from flowing directly to the outlet opening 14 under normal flow conditions. The baffle wall assembly forms opposed inlet flumes 26, opposed blocking walls 28, an upper plate 30 and an outlet channel or chute 32. Here, the outlet chute 32 is formed by a pair of upright walls 33 of the baffle structure 25 in combination with the rear walls 35 of the inlet flumes 26, where the walls 33 are angled relative to each other and the walls 35 are angled relative to each other to form a generally diamond-shaped chute 32 in top plan view. However, other chute configurations are possible.

The circumferential position of the inlet pipe 16 could vary from that shown, and a top grate inlet structure may also, or alternatively, be provided for the unit to allow stormwater to enter from the top at the upstream side of the baffle arrangement 25. Moreover, multiple inlets to the tank could be provided (e.g., (i) multiple inlet pipes connected to multiple sidewall openings and/or (ii) multiple top inlet openings with respective grates).

Figure 14:
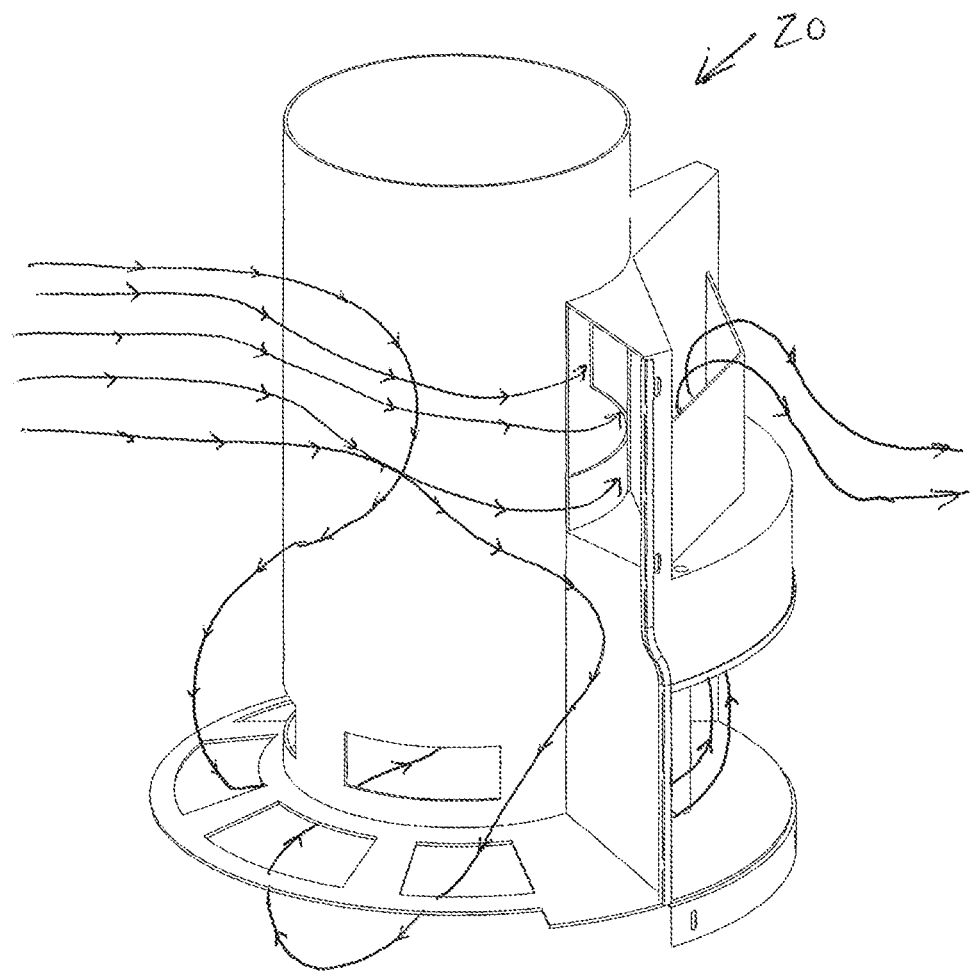
FIG. 14 shows a perspective view of the separator unit insert with exemplary water treatment flow paths depicted.
Figure 15:
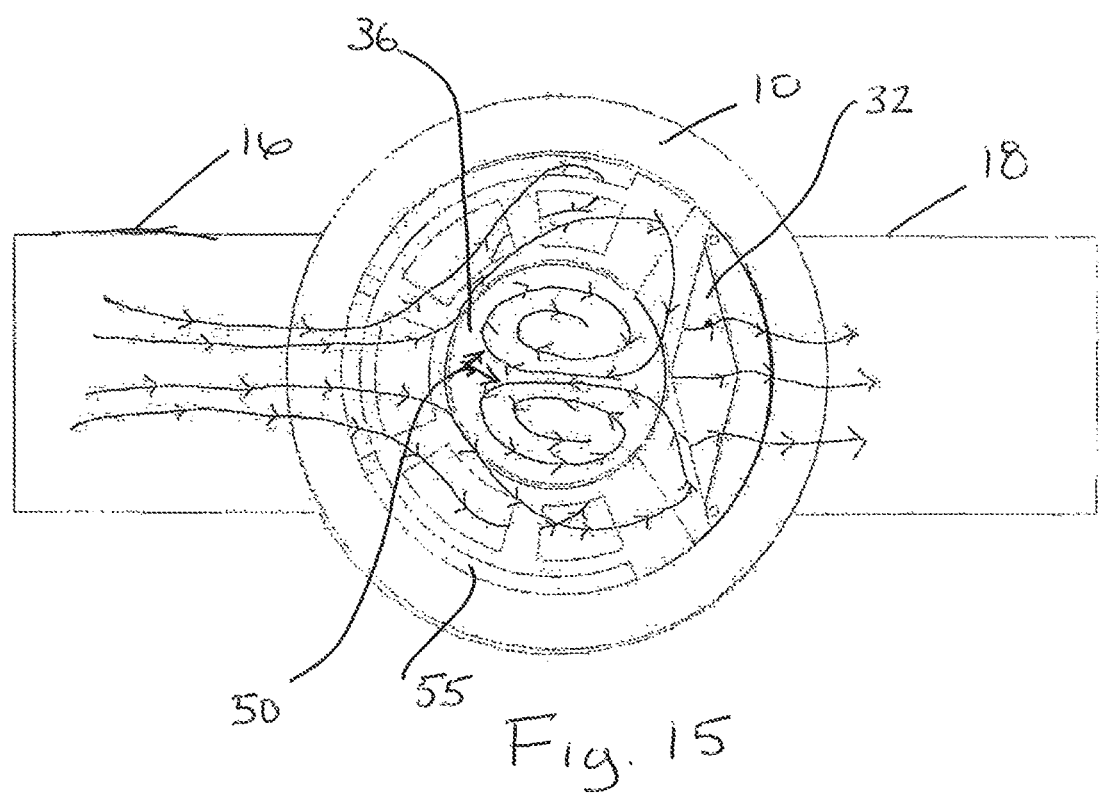
FIG. 15 shows a top plan view of the separator with exemplary water treatment flow paths depicted.
Figure 16:
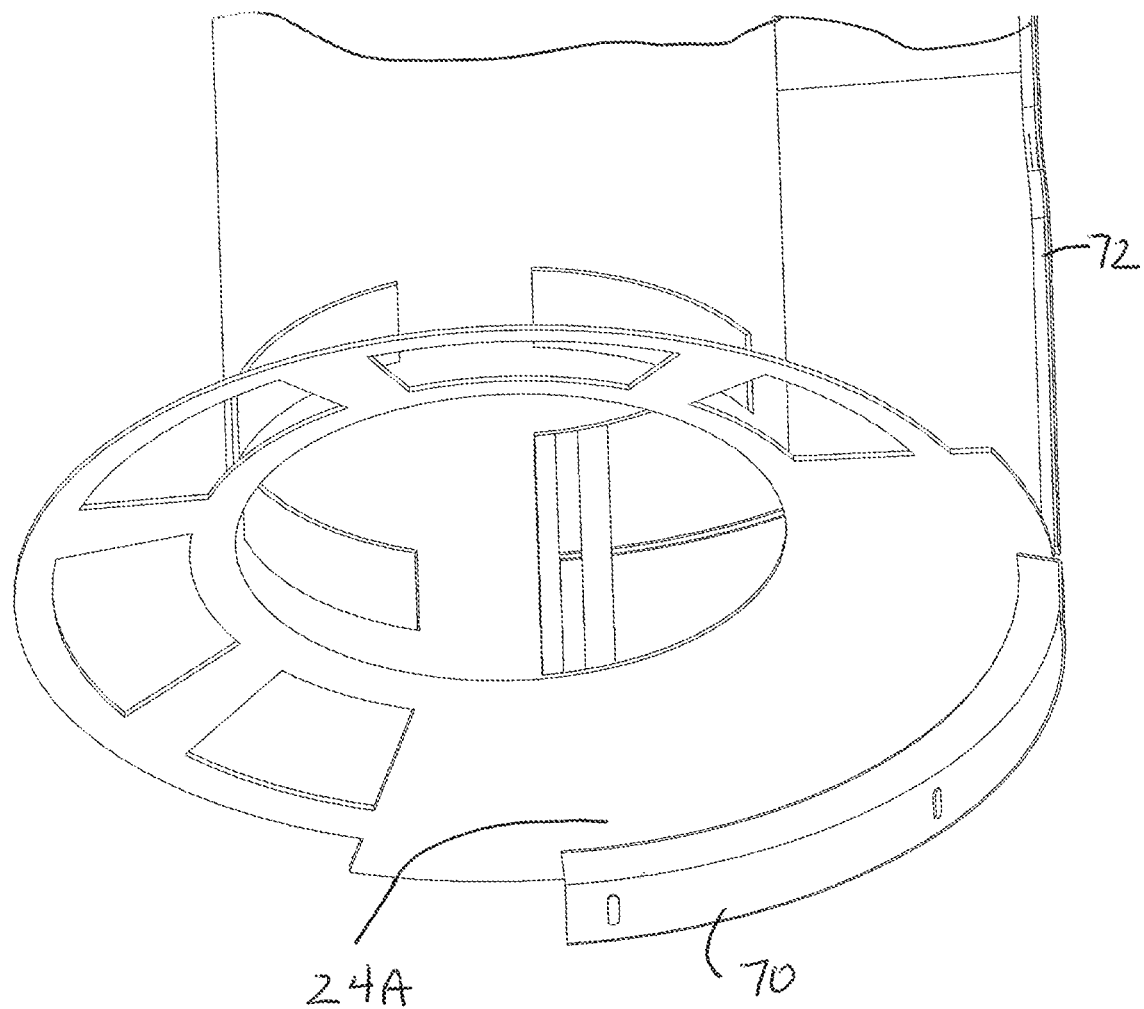
FIG. 16 is a partial bottom perspective of the separator unit insert and associated mount bracket.
Figure 17:
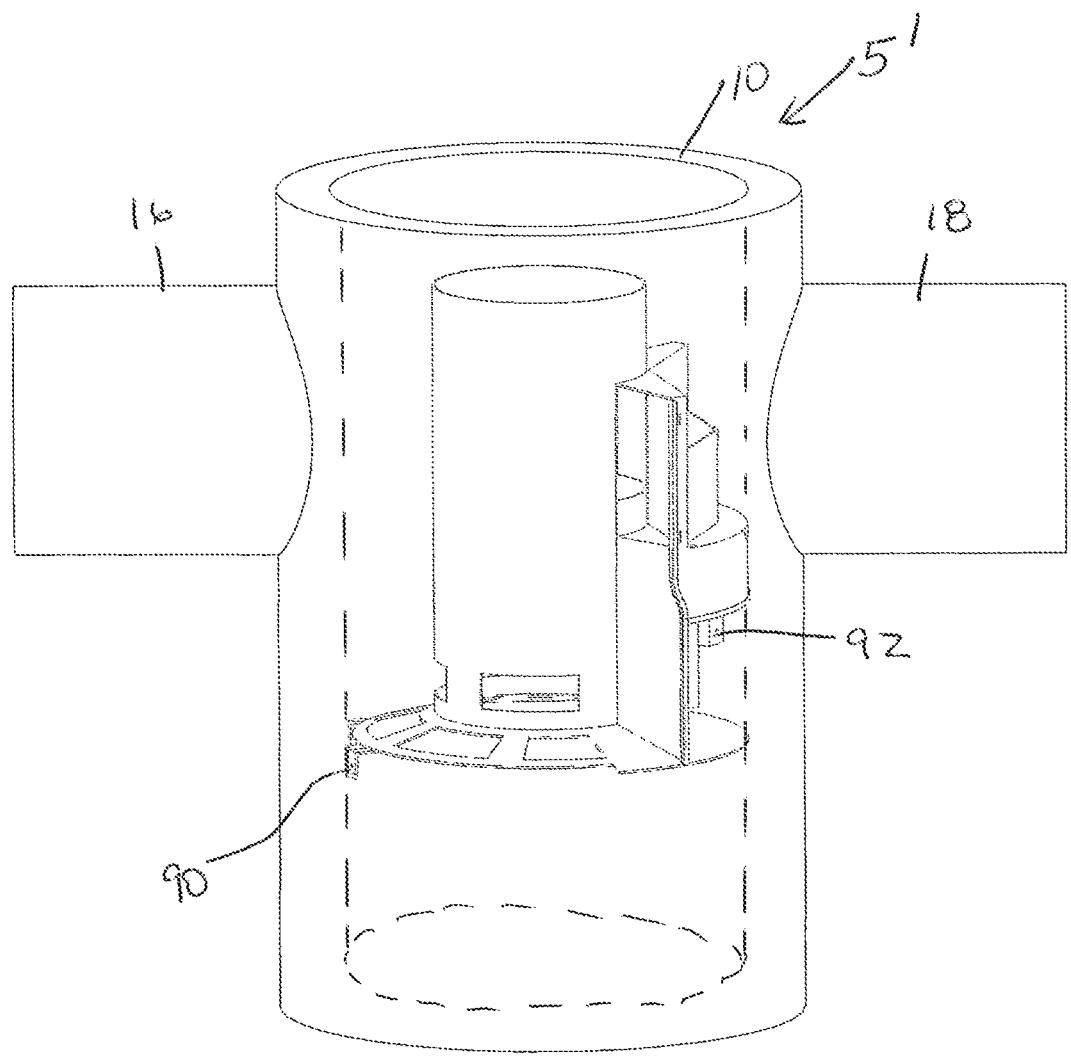
FIGS. 17-20 depict an alternative embodiment of a separator unit.
Figure 18:
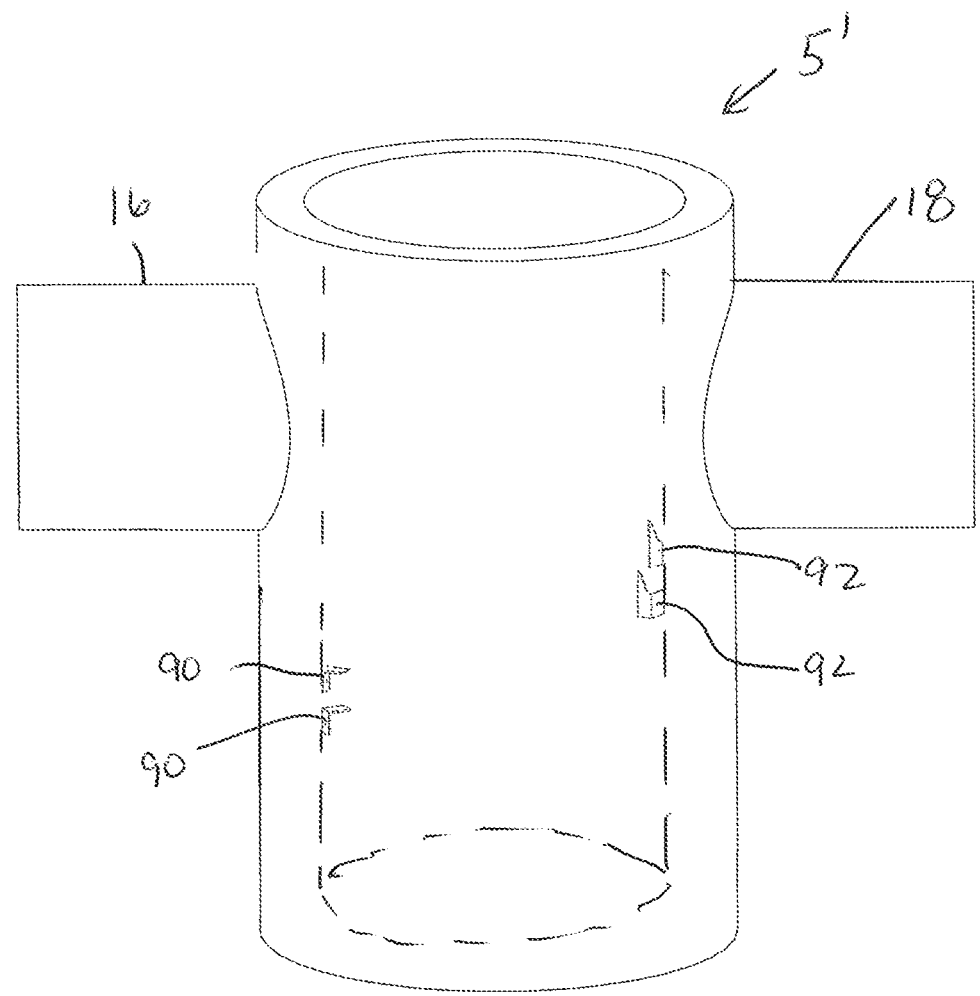
Figure 19:
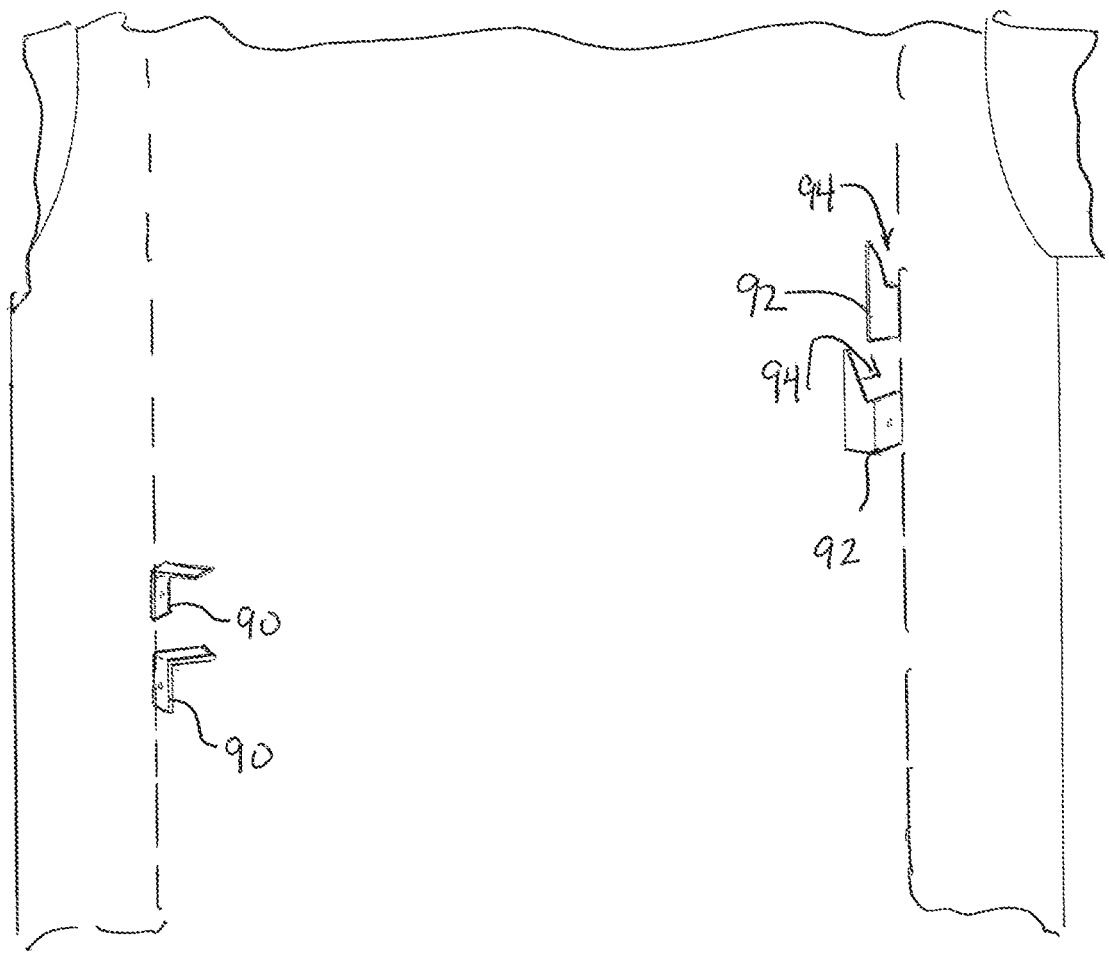
Figure 20:
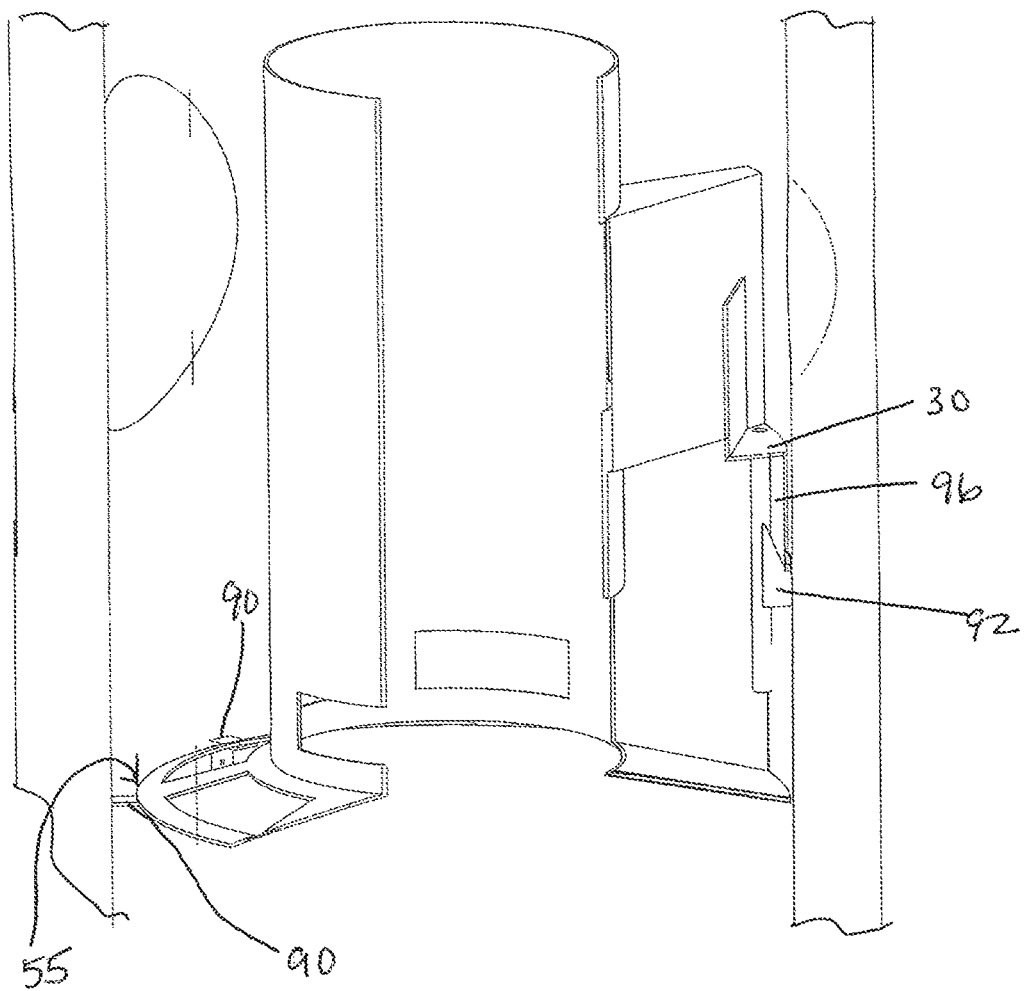

As best seen in FIGS. 14 and 15, water enters the unit through the pipe 16 and opening 12, the water will impact the cylinder 22 and be redirected to the left, right and downward. Some water that is directed to the right will flow into the right flume 26, and some water directed to the left will flow into the left flume 26. The water traveling downward will flow into the sump 34 below the skirt 24.

Water traveling into and through the opposing flumes 26 is directed by the flume walls (e.g., rear walls 35 and top wall 43) so as to enter the center cylinder chamber 36, with the inward end of each flume positioned and oriented such that vortices (vortex flows) 50 rotating in opposite directions are created as the water moves into and downward through the chamber 36 toward the open bottom of the cylinder 22 and the cylinder side wall outlet 40. In the illustrated embodiment, the inward ends of the two flumes 26 are positioned proximate each other. The interaction of the opposed vortices 50 generates multiple high and low velocity zones within the same treatment volume, which facilitates enhanced particle settling. As water swirls downward in the center cylinder chamber 36 and travels downward in the inlet chamber 38, which is on the outside of cylinder 22 and at the upstream side (or inlet side) of the baffle wall assembly 25, sediment settles into the sump region 34 and treated water exits through a lower side outlet window or opening 40 in the cylinder wall. The treated water travels up through the outlet chute 32 in order to exit the system. The outlet chute 32 is situated between the flumes 26 and outlet pipe 18 such that it provides appropriate dimensions for treated flows to exit, access for maintenance and lessens the chance for trash and debris to clog the openings. The outlet deck/plate 30 may incorporate one or more openings 41 with corresponding draindown pipes 42 that extend downward and allow the system to drain to the outlet pipe invert elevation after the storm event has subsided and water flow into the tank stops. In such cases, the higher water elevation on the inlet side of the baffle assembly will cause water flow up the pipe(s) 42 until the water level on each side of the baffle assembly is the same (e.g., at the outlet pipe invert in cases such as that illustrated where the top of each draindown tube is at the invert height). In the illustrated embodiment, the down cylinder 22 may also include several side openings 80 on the inlet side of the baffle structure 25 and toward the bottom of the cylinder where the cylinder joins the skirt 24. The side openings 80 may aid in providing a down flow or down pressure relief in the cylinder to reduce scouring of the sump 34. However, in other embodiments those side openings 80 may not be present.

The flumes 26 are designed to accept a specific treatment flow rate. When rain events generate flows at or below the capacity of the flumes, the stormwater is directed into the center cylinder chamber 36 by the flumes 26, through an upper cylinder opening 60. When flows exceed the capacity of the flumes 26, the system is designed to internally bypass the excess flows over the top of the flumes 26 to exit the system without re-suspending or washing out previously captured trash, hydrocarbons and sediment. Here, the flumes 26 include a bottom wall portion 23 that sit below the lower edge of the cylinder opening 60.

The system incorporates a partially perforated slanted skirt 24, with a set of openings 27 that also angle downwardly with the skirt. The skirt serves a number of functions. The first is to provide separation between the sump 34 where captured sediment is stored and the treatment zone above. The separation also equalizes the pressure between the sump 34 and treatment chambers 36 and 38, reducing the potential for high velocity zones that may hinder particle settling or re-suspend previously captured pollutants. The downward slope of the skirt facilitates sediment transport into the sump region. Notably, the openings 27 are located only on the inlet side of the system, with skirt portion 24A being a solid wall configuration, which improves sediment transport on the inlet side of the system. The solid portion 24A of the skirt is located on the outlet side of the system which eliminates resuspension of captured material in the outlet chamber. In the circumferential region of the openings 27, the lower outer edge of the skirt 24 is spaced from the inner surface of the tank wall 15, providing a circumferentially extending gap 55 between the skirt and the wall 15 along the majority of the peripheral lower edge portion of the skirt that is located on the upstream or inlet side of the baffle structure 25. However, the peripheral edge of the skirt 24 in the vicinity of the walls 28 and on the downstream or outlet side of the baffle structure 25 extends all the way to the inner surface of the tank wall 10, which helps reduce scouring during high system flows. The circumferential extent of the gap 55 may be at least one hundred fifty degrees, such as at least one hundred eighty degrees, or between about one hundred fifty degrees and about two hundred forty degrees.

Below each of the two flumes 26, a solid wall 28 extends outward from the cylinder 22 to the tank wall 15 and connects the bottom of the flumes 26 to the top of the skirt 24. A rubber gasket or caulk can be placed between the flange at the outer perimeter of the wall 28 and the tank wall to provide a solid seal. The walls 28 prevent short circuiting in the system, improving pollutant capture. The wall flanges also provide a mechanical attachment point for the internal components in the system. In particular, the insert 20 may be attached to the inside of the tank wall 15 via an attachment bracket 70 that is installed in the tank prior to dropping the insert into the tank. Once the insert 20 seats on the bracket 70 (e.g., here the peripheral edge of skirt portion 24A sits on the bracket 70), further mechanical attachment may be made near the top of each of the two flumes on the flanges 72 at the outer edges of the flume walls (e.g., by bolts extending through the flanges into the tank wall, or by attachment of the flanges to upper brackets mounted on the tank walls).

Of note, the opposed flumes 26 of the separator unit help to dissipate energy and slow down flows, enhancing trash capture. The use of opposed vortices 50 in the inner chamber 36 creates high-velocity and low-velocity zones to enhance particle settling. The overall influent flow path is such that the flow splits and converges multiple times within the system. The partially perforated slanted skirt 24 is configured to assist sediment transport down to the sump and to reduce resuspension. The inlet chamber 38 targets coarse sediment and the center chamber 36 targets storage of trash and finer sediment. The outlet chute is sized to control overall treatment flow through the unit, increasing residence time.

Referring now to FIGS. 17-20, an alternative embodiment of a separator unit 5' is shown, where the insert structure 20 includes substantially the same configuration as that of separator unit 5, but is mounted via a different bracket system. In particular, one or more (here two) lower mount brackets 90 and one or more (here two) upper mount brackets 92 are engaged on the tank wall. Each lower mount bracket 90 extends across the circumferentially extending gap 55 to support the lower peripheral edge portion of the skirt on the inlet side of the baffle assembly. Each upper mount bracket 92 is engaged on the wall of the tank on the outlet side of the baffle assembly, and each upper mount bracket 92 defines an upwardly facing slot 94. The baffle assembly includes a downwardly extending wall portion 96 (here extending down from the upper plate 30) that seats within the upwardly facing slot(s) 94. The combined upper and lower bracket configuration provides simple installation from the top and a secure and stable connection to the tank wall.

In both of the above embodiments, the tank 10 forms a separator casing that receives untreated stormwater and discharges treated stormwater, with the baffle assembly forming a connection plate that coupled to the inner surface of the separation casing for preventing untreated stormwater from being prematurely discharged. The down cylinder forms guide plate that coupled to the connection plate in an annular chamber of the separator casing. The skirt is coupled to the inner surface of the separation casing spatially below the guide plate and defines a storage chamber (sump 34) in the separator casing. The skirt has a skirt body having a hole at a center portion thereof for permitting course settling substances from the stormwater to pass through the skirt into the storage chamber and a plurality of downwardly inclined openings 37 at an outer periphery thereof for permitting fine settling substances to pass through the skirt into the storage chamber.

What is claimed is:

1. A separator unit, comprising:
a tank defining an internal volume and having an inlet and an outlet;
an insert within the tank, the insert including a down cylinder substantially centrally disposed within the tank and a baffle assembly at an external side of the down cylinder, the baffle assembly defining first and second inlet flumes for flowing incoming water from an external side of the down cylinder to an internal chamber within the down cylinder, where inward ends of the first and second inlet flumes are positioned and oriented to create first and second vortex flows that progress downward within the internal chamber, wherein a rotational direction of the first vortex flow is opposite a rotational direction of the second vortex flow in top plan view.

2. The separator unit of claim 1, wherein the first inlet flume has a rear wall, a top wall and a bottom wall, and the second inlet flume has a rear wall, a top wall and a bottom wall.

3. The separator unit of claim 2, wherein the down cylinder has at least one upper wall opening through which water traveling along the first and second inlet flumes enters the internal chamber, and each bottom wall is located at a height below a lower edge of the upper wall opening.

4. The separator unit of claim 1, further comprising a downwardly angled skirt extending outward from a bottom end of the down cylinder, the downwardly angled skirt including multiple downwardly angled openings on an inlet side of the baffle assembly, and the downwardly angled skirt being of solid wall configuration, with no openings, on an outlet side of the baffle assembly, wherein the downwardly angled skirt is spaced above a bottom of the tank to define a material collection sump below the downwardly angled skirt.

5. The separator unit of claim 4, wherein the downwardly angled skirt includes a first lower peripheral edge portion on the inlet side of the baffle assembly, the first lower peripheral edge portion spaced from an internal surface of a wall of the tank to define a circumferentially extending gap therebetween.

6. The separator unit of claim 5, wherein the downwardly extending skirt includes a second lower peripheral edge portion on the outlet side of the baffle assembly, wherein at least part of the first lower peripheral edge portion or the second lower peripheral edge portion sits upon a mount bracket engaged on the wall of the tank.

7. The separator unit of claim 6, wherein the mount bracket is engaged on the wall of the tank on the inlet side of the baffle assembly and extends across the circumferentially extending gap to support the first lower peripheral edge portion.

8. The separator unit of claim 7, wherein the baffle assembly includes a first upper flange on a baffle wall portion outward of the first inlet flume and a second upper flange on a baffle wall portion outward of the second inlet flume, wherein the first flange and the second flange are connected to the wall of the tank.

9. The separator unit of claim 7, wherein the mount bracket is a lower mount bracket, wherein an upper mount bracket is engaged on the wall of the tank on the outlet side of the baffle assembly, the upper mount bracket defining an upwardly facing slot, wherein the baffle assembly includes a downwardly extending wall portion that seats within the upwardly facing slot.

10. The separator unit of claim 1, wherein the down cylinder includes at least one lower side wall opening leading to an outlet side of the baffle assembly and at least one lower side wall opening leading to an inlet side of the baffle assembly.

11. The separator unit of claim 1, wherein the down cylinder includes a lower side wall opening through which water moves to a downstream side of the baffle assembly.

12. The separator unit of claim 11, wherein the baffle assembly includes an upwardly extending outlet chute above the lower wall opening and through which water moves to reach the outlet of the tank.

13. The separator unit of claim 12, wherein the upwardly extending outlet chute is defined by rear walls of the first and second inlet flumes and by one or additional more walls that extend upward from a horizontal peripheral plate section of the baffle assembly.

14. The separator unit of claim 12, wherein the upwardly extending outlet chute is substantially diamond-shaped in top plan view.

15. The separator unit of claim 12, wherein the baffle assembly includes at least one draindown tube on the outlet side of the baffle assembly to enable water on the inlet side of the baffle assembly to drain down after flow into the inlet of the tank stops, the draindown tube having an upper end below a top of the outlet chute.

16. A method of removing material from a flow of stormwater, comprising:
utilizing a separator unit with a tank defining an internal volume and having an inlet opening and an outlet opening, and a down cylinder substantially centrally disposed within the tank;
flowing water into the internal volume and externally of the down cylinder through the inlet opening;
splitting the incoming flow of water into at least a first flow and a second flow, the first flow moving in a first direction externally around the down cylinder and then through an opening in the down cylinder into an internal chamber defined by the down cylinder, the second flow moving in a second direction externally around the down cylinder and then through an opening in the down cylinder into the internal chamber.

17. The method of claim 16, wherein the first flow forms a first vortex flow within the internal chamber and the second flow forms a second vortex flow within the internal chamber.

18. The method of claim 17, the first vortex flow is substantially maintained on a first side of the internal chamber and the second vortex flow is substantially maintained on a second side of the internal chamber, and the second vortex flow opposes the first vortex flow.

19. The method of claim 16, wherein the splitting further includes splitting the incoming flow of water into a third flow and a fourth flow, the third flow moving in the first direction externally around the down cylinder and then moving downward without entering the internal chamber, the fourth flow moving in the second direction externally around the down cylinder and then moving downward without entering the internal chamber.

20. The method of claim 16, wherein the separator unit includes a baffle assembly that, in combination with the down cylinder separates the inlet opening from the outlet opening, and the method includes allowing water to flow through a lower opening in the down cylinder in order to reach a downstream side of the baffle assembly and progress to the outlet opening.

21. The method of claim 20, wherein the baffle assembly defines an upwardly extending outlet chute through which water exiting the internal chamber passes in order to reach the outlet opening.

22. A separator unit, comprising:
a tank defining an internal volume and having an inlet and an outlet;
a down cylinder substantially centrally disposed within the tank;
a baffle assembly at an external side of the down cylinder, the baffle assembly including wall portions that extend between the down cylinder and the tank to divide a space between the down cylinder and the tank into an upstream side into which water from the inlet flows and a downstream side from which water flows to the outlet;
a downwardly angled skirt extending outward from a bottom end of the down cylinder, the downwardly angled skirt including multiple downwardly angled openings on the upstream side of the baffle assembly, and the downwardly angled skirt being of solid wall configuration, with no openings, on the downstream side of the baffle assembly, wherein the downwardly angled skirt is spaced above a bottom of the tank to define a material collection sump below the downwardly angled skirt.

23. The separator unit of claim 22, wherein the downwardly angled skirt includes a first lower peripheral edge portion on the inlet side of the baffle assembly, the first lower peripheral edge portion spaced from an internal surface of a wall of the tank to define a circumferentially extending gap therebetween, wherein the gap extends through at least one hundred eighty degrees.

24. The separator unit of claim 23, wherein the downwardly extending skirt includes a second lower peripheral edge portion on the downstream side of the baffle assembly, wherein at least part of the first lower peripheral edge portion or the second lower peripheral edge portion sits upon a mount bracket engaged on the wall of the tank.

25. The separator unit of claim 24, wherein the mount bracket is engaged on the wall of the tank on the inlet side of the baffle assembly and extends across the circumferentially extending gap to support the first lower peripheral edge portion.

26. The separator unit of claim 25, wherein the mount bracket is a lower mount bracket, wherein an upper mount bracket is engaged on the wall of the tank on the downstream side of the baffle assembly, the upper mount bracket defining an upwardly facing slot, wherein the baffle assembly includes a downwardly extending wall portion that seats within the upwardly facing slot.

27. A separator unit, comprising:
a tank defining an internal volume and having an inlet and an outlet;
a down cylinder substantially centrally disposed within the tank;
a baffle assembly at an external side of the down cylinder, the baffle assembly configured to divide a space between the down cylinder and the tank into an upstream side into which water from the inlet flows and a downstream side from which water flows to the outlet;
a downwardly angled skirt extending outward from a bottom end of the down cylinder, the downwardly angled skirt including multiple downwardly angled openings on the upstream side of the baffle assembly, and the downwardly angled skirt being of solid wall configuration, with no openings, on the downstream side of the baffle assembly, wherein the downwardly angled skirt is spaced above a bottom of the tank to define a material collection sump below the downwardly angled skirt;
wherein the down cylinder includes at least one side wall opening disposed on the upstream side of the baffle assembly, the side wall opening located toward a lower end of the down cylinder and above the downwardly angled skirt.

28. A separator unit, comprising:
a tank defining an internal volume and having an inlet and an outlet;
an insert within the tank, the insert including a down cylinder within the tank, the down cylinder having a first inlet path through which liquid enters the down cylinder in a direction to create a first vortex flow that progresses downward within the down cylinder, the down cylinder having a second inlet path through which liquid enters the down cylinder in a direction to create a second vortex flow that progresses downward within the down cylinder, wherein the second vortex flow opposes the first vortex flow.

\* \* \* \* \*